March 22, 1949. P. N. SITTON 2,465,289
TRIPOD
Filed Nov. 7, 1945
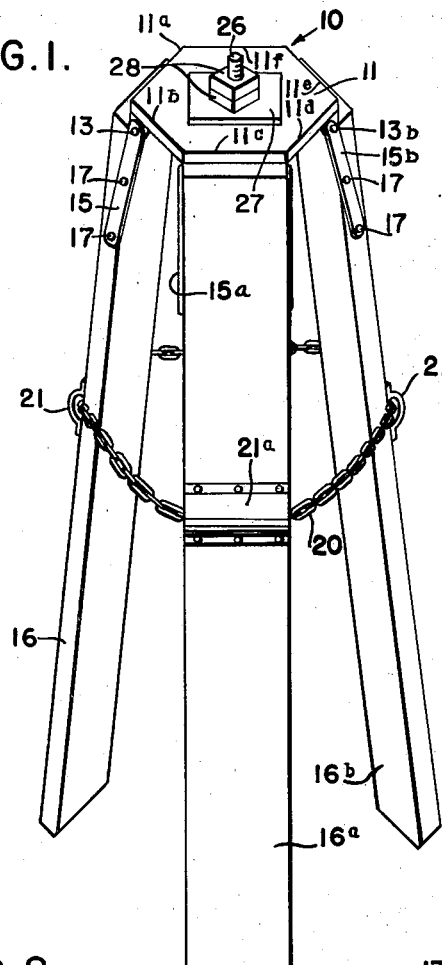
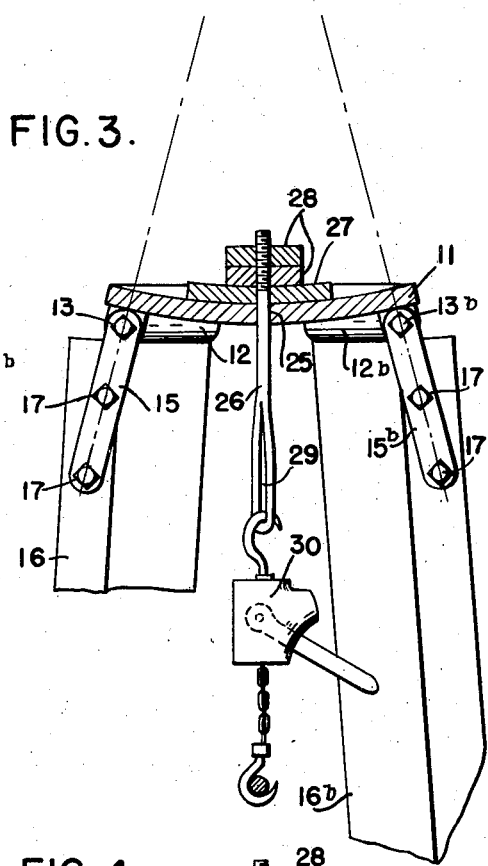
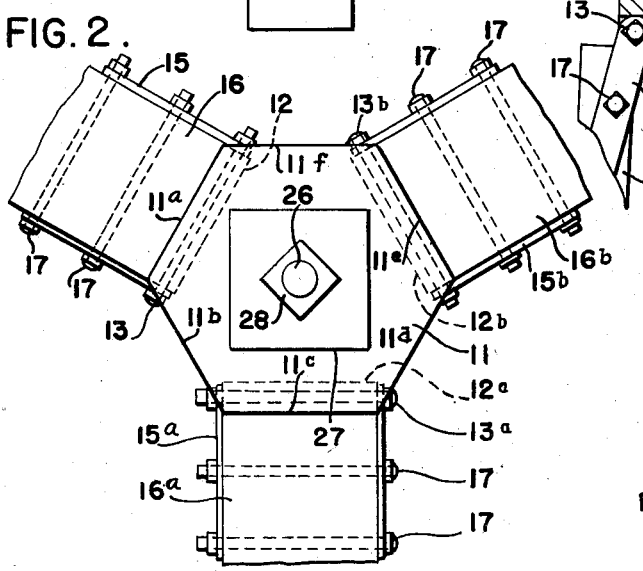
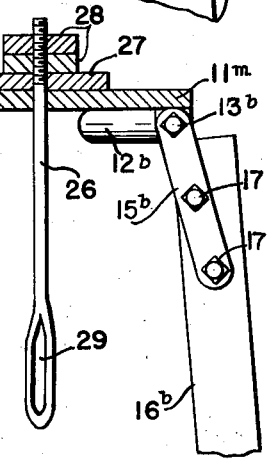
INVENTOR
PHILIP N. SITTON
BY Toulmin & Toulmin
ATTORNEYS Patented Mar. 22, 1949

2,465,289

UNITED STATES PATENT OFFICE 2,465,289

TRIPOD

Philip N. Sitton, Dayton, Ohio

Application November 7, 1945, Serial No. 627,201

3 Claims. (Cl. 248—192)

This invention relates to tripod supports, and particularly to improved means for increasing the rigidity of such supports.

An object of the invention is to provide an improved tripod supporting device that is sturdy and will support relatively heavy objects, and wherein the tripod device is collapsible to provide for portability thereof.

Another object of the invention is to provide an improved tripod head for a tripod supporting device.

Still another object of the invention is to provide an improved tripod head for a tripod supporting device wherein the tripod head consists of a concave or dished plate to increase the rigidity of support for the device.

Further objects and advantages will become apparent from the drawings and the following description.

In the drawings:

Figure 1 is a perspective elevational view of the improved tripod device of this invention.

Figure 2 is a top elevational view of the improved head of the tripod device.

Figure 3 is a vertical cross-sectional view of the tripod device.

Figure 4 is a vertical cross-sectional view similar to Figure 3 of a slightly modified form of the tripod device.

In this invention the improved tripod device consists of a tripod head 10 that is composed of a hexagonal plate 11 having the edges 11—a to 11—f inclusive. A hinge bar 12 is provided adjacent the edge 11—a of the tripod head 10, and corresponding hinge bars 12—a and 12—b are placed adjacent the edges 11—c and 11—e of the head 10. These hinge bars 12, 12—a and 12—b are preferably constructed as solid bar elements with a hole drilled through the same to receive the hinge pins 13, 13—a and 13—b respectively. However, the hinge bars 12, 12—a and 12—b may consist of a formed U-shaped metal member to receive the respective hinge pins. The hinge bars 12, 12—a and 12—b are suitably secured to the under side of the plate 11, such as by a welding operation.

The head 11 is in the form of a concave plate, or dished plate, as illustrated in Figure 3, to increase the rigidity of the plate 11 when supporting a heavy object. The concave cross-section of the plate 11 tends to triangulate the forces applied to the plate at the hinge connections 12, 12—a and 12—b, thus increasing the rigidity of the tripod support.

Hinge links 15 are provided adjacent each end of the hinge bars, 12, 12—a and 12—b and have one end thereof pivotly connected to the hinge pins 13, 13—a and 13—b respectively. The opposite ends of the hinge links are connected to supporting legs 16, 16—a and 16—b associated with the hinge pins 12, 12—a and 12—b respectively.

The hinge links 15 are secured to the legs 16, 16—a and 16—b by suitable fastening means such as the bolts 17. The legs 16, 16—a and 16—b may be constructed of any material desired and in the instance illustrated in the drawing are constructed of wood.

A chain or flexible line 20 is provided to encircle the legs 16, 16—a and 16—b, and is held in position upon the various legs by means of loop brackets 21, 21—a and 21—b. The chain 20 thus prevents the legs 16, 16—a and 16—b from spreading beyond a predetermined position.

The plate 11 is provided with a central opening 25 therein that receives a support stud 26 therethrough. The stud 26 passes through an auxiliary plate 27 that rests upon the hexagonal plate 11. The stud 26 being provided with a pair of nuts 28 on the upper end thereof. The plate 27 is also concave to conform to the shape of the plate 11 and thereby spread the load of the stud 26 over a larger surface area of the plate 11.

The stud 26 is provided with a loop 29 in the lower end thereof to receive a lifting hoist 30 of any suitable type for the purpose of lifting heavy objects.

In Figure 4 there is illustrated a slightly modified arrangement of the device just described in that the plate 11—m is illustrated as a flat plate instead of being a concave plate as illustrated in Figure 3. Insofar as other features of the tripod are concerned, the device illustrated in Figure 4 is constructed in the same manner as the device illustrated in Figures 1 to 3.

The particular construction of the tripod is such that it provides extreme rigidity and stability for the purpose of lifting heavy objects, and can be folded into a compact arrangement to provide portability of the tripod, thus in effect the tripod provides a portable crane that can be used wherever and whenever desired.

While the apparatus disclosed and described herein constitutes a preferred form of the invention, yet it will be understood that the device is capable of modification without departing from the spirit of the invention and that all modifications that fall within the scope of the appended claims are intended to be included herein.

Having thus fully described my invention, what I claim as new and desire to secure by Letters Patent is:

1. A tripod support comprising in combination, a tripod head consisting of a hexagonal plate having equal sides, hinge bars, secured to alternate edges of said hexagonal plate, hinge pins in said hinge bars, leg means connected to said hinge pins, a flexible line carried by said legs and encircling the same when in extended position, and loop means supporting said flexible line upon said legs at substantially the same distance from the hinge connections of said legs with said hinge bars.

2. A tripod supporting device which comprises in combination, a tripod head consisting of a multiple sided plate having certain sides thereof positioned equidistantly relative to one another, a hinge bar secured beneath said plate adjacent each of said equidistantly spaced edges, leg means pivotly connected to each of said hinge bars, a flexible line encircling the outer periphery of said leg means when extended and positioned thereon equidistantly from the hinge connections of said legs to said plate, an auxiliary supporting plate supported upon said first mentioned plate and means suspended from said auxiliary plate through the axis of said first mentioned plate for supporting a lifting device thereon.

3. A tripod supporting device which comprises in combination, a tripod head consisting of a multiple sided concave plate having certain sides thereof positioned equidistantly relative to one another, a hinge bar secured beneath said plate adjacent each of said equidistantly spaced edges, leg means pivotly connected to each of said hinge bars, a flexible line encircling the outer periphery of said leg means when extended and positioned thereon equidistantly from the hinge connections of said legs to said plate, an auxiliary plate supported upon said first mentioned plate and extending radially equidistantly on diametrically opposite side so the axis of said first mentioned plate to distribute a load carried by said auxiliary plate over a large area of said first mentioned plate, and means suspended from the axis of said auxiliary plate and passing through the axis of said first mentioned plate for supporting a lifting device thereon.

PHILIP N. SITTON.

REFERENCES CITED

The following references are of record in the file of this patent:

UNITED STATES PATENTS

| Number | Name | Date |
|---|---|---|
| 955,140 | Cronk | Apr. 19, 1910 |
| 1,177,165 | Akeley | Mar. 28, 1916 |
| 1,240,119 | Burns | Sept. 11, 1917 |
| 1,361,469 | Kingsbury | Dec. 7, 1920 |
| 1,456,356 | Bentley | May 22, 1923 |
| 1,598,943 | Tessier | Sept. 7, 1926 |
| 1,674,493 | Adams | June 19, 1928 |
| 1,794,726 | Mitchell | Mar. 3, 1931 |
| 2,297,927 | Whitman | Oct. 6, 1942 |